LATCHING STAGE FOR REGISTER WITH AUTOMATIC RESETTING

Filed April 5, 1965

INVENTOR

OLIN L. MAC SORLEY

BY Melvin P. Williams

ATTORNEY

United States Patent Office 3,339,145

Patented Aug. 29, 1967

3,339,145

LATCHING STAGE FOR REGISTER WITH AUTOMATIC RESETTING

Olin L. MacSorley, Beacon, N.Y., assignor to International Business Machines Corporation, Armonk, N.Y., a corporation of New York Filed Apr. 5, 1965, Ser. No. 445,308
1 Claim. (Cl. 328—92)

ABSTRACT OF THE DISCLOSURE

In a large scale data processing system having plural-stage registers, there is disclosed a typical stage formed by AND, OR-INVERT and inverter circuits.

This invention relates to a set-reset register for use in a data processing system.

In the data processing art, a variety of registering stages have been known. Certain of these include AND circuits and OR circuits arranged in feed-back relationship, with or without inverting circuits. However, timing considerations have generally forced the use of complicated arrangements so as to prevent race conditions which degrade the reliability of the simple feed-back latches.

In many instances, the number of latches required for a large register may render the cost of use of refined circuitry prohibitive; on the other hand, reliable operation is absolutely essential in the data processing system.

Therefore, an object of the present invention is to provide a reliable yet simple registering means.

Another object of the invention is to provide a registering means which is automatically responsive, in dependence only upon a single control, to assume either one of two states in successive periods of operation.

A set-reset register means in accordance with the present invention is utilized in one embodiment of a data processing system disclosed in a copending application of the same assignee, filed on even date herewith, Ser. No. 445,326, entitled, Large Scale Data Processing System and a continuation-in-part application thereof, filed Jan. 13, 1967, Ser. No. 609,238.

Other objects, features and advantages of the present invention will become more apparent in the light of the following detailed description of a particular embodiment thereof, as shown in the accompanying drawing, wherein.

Figure 1:
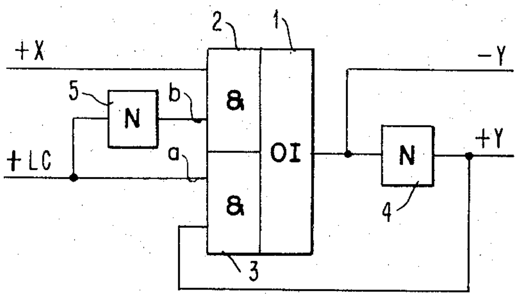
FIG. 1 is a schematic block diagram of a set-reset register stage in accordance with the present invention.
Figure 2:
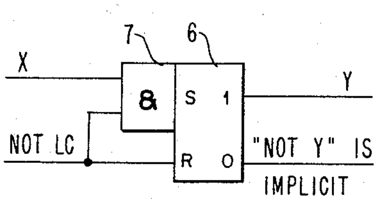
FIG. 2 is a simplified representation of said stage as it appears in said copending application.

In FIG. 1, a simple latch is shown. This comprises an "AND-OR-INVERTER" combination which includes an OR circuit 1 and two AND circuits 2, 3 as well as two inverters 4, 5 (each having a delay of about seven nanoseconds). In normal operation, whenever the +LC line is negative, the inverter 5 will provide a positive signal on line "*b*" to the AND circuit 2 so that a positive signal on the +X line, whenever it may arrive, will cause the AND circuit 2 to activate the OR-INVERT circuit 1 thereby generating a negative signal on the −Y line. If the positive signal on the +X line is removed, then the negative signal on the −Y line will disappear. The negative signal on the −Y line causes the inverter 4 to generate a positive signal on the +Y line which is fed back to an AND circuit 3; however, so long as the +LC line is negative the AND circuit 3 will not operate, so that, under this condition, the circuit of FIG. 1 is essentially an AND circuit whereby a positive signal on the +X line and the positive signal from the inverter 5 pass through the AND circuit 2, become inverted in the OR circuit 1, and no latching takes place.

Figure 3:
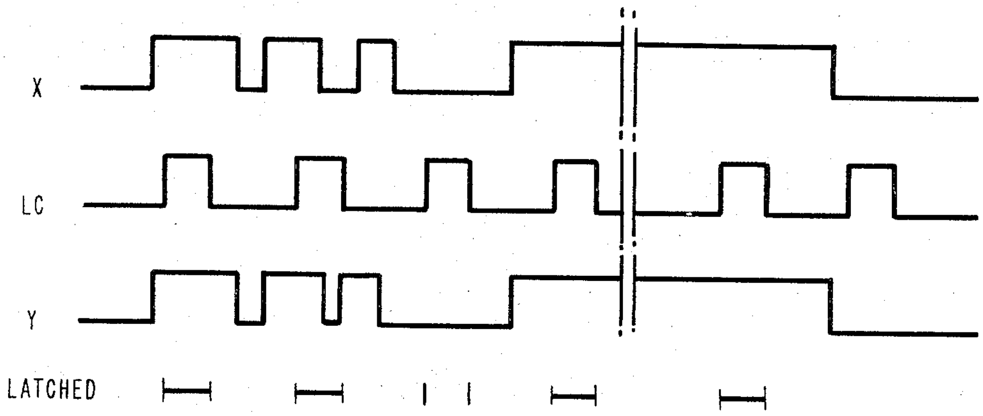
FIG. 3 is a timing diagram of the general operation of the stage shown in FIG. 1.
Figure 4:
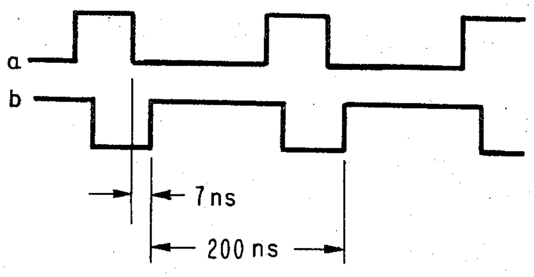
FIG. 4 is a timing diagram showing the detail of the set-reset operation of the stage shown in FIG. 1.

When the signal on the +LC line turns positive then any overlapping positive signal on the +X line will cause the signal on the +Y line to be gated through the AND circuit 3 thereby causing the circuit of FIG. 1 to become latched for the duration of the +LC signal. When the LC signal returns to a negative condition then the state of the latch can again be changed. During the time that the circuit is latched, the AND circuit 3 will be passing a signal through the OR circuit 1 provided the latch was on at the time that the latching condition commenced, and the AND circuit 2 is blocked by the inverter 5. When the LC line returns to a negative condition, the AND circuit 3 will be immediately blocked, and the inverter 5, having about a seven nanosecond delay, will later cause the unblocking of the AND circuit 2. Thus, there is a short period of about seven nanoseconds (as illustrated in FIG. 4) when the circuit of FIG. 1 will have no output whatever. This is of too short a duration to be illustrated in FIG. 3 which shows the operation of the latch of FIG. 1 in general terms.

The main feature of the present invention is its ability to become reset in response to the timing or other control signal, automatically, at each appearance thereof, due to the fact that the effect of the control signal is to first block the AND circuit 3 in FIG. 1, and after the delay of the inverter has passed, to enable operation of the AND circuit 2. This provides the seven nanosecond reset as shown in FIG. 4. Utilization of this feature avoids the necessity of remote resetting lines being sent from one part of a large scale data processing system to another part of the same system, the resetting taking place automatically by the lack of the continued presence of the setting signal, as illustrated in said copending application.

While the invention has been shown and described with respect to a preferred embodiment thereof, it should be understood by those skilled in the art that various changes and omissions in the form and detail thereof may be made therein without departing from the spirit and scope of the invention.

What is claimed is:

A set-reset register, comprising:

a pair of AND circuits each having a plurality of inputs and an output;

an OR-INVERT circuit having a plurality of inputs and an output, each input being connected to an output of a different one of said AND circuits;

a first inverter having an input and an output, the input being connected to the output of said OR-INVERT circuit and the output being connected to an input of a first one of said AND circuits;

a second inverter having an input and an output, the output being connected to an input of a second of said AND circuits;

control signal means, connected to said first AND circuit and to said second inverter for applying control signals to an input of said first AND circuit and to the input of the second inverter; and data signal means, connected to said second AND circuit, for applying data signals to an input of said second AND circuit.

References Cited

UNITED STATES PATENTS 3,075,091 1/1963 Homan ------------ 307—88.5

ARTHUR GAUSS, *Primary Examiner.*

S. D. MILLER, *Assistant Examiner.*